(12) United States Patent
Van Rooijen

(10) Patent No.: US 7,875,096 B2
(45) Date of Patent: Jan. 25, 2011

(54) FERTILIZER

(75) Inventor: Willem Abraham Van Rooijen, Vereeniging (ZA)

(73) Assignee: International Carbon Technologies AS (PTY) Ltd., Vanderbijlpark (ZA)

( * ) Notice: Subject to any disclaimer, the term of this patent is extended or adjusted under 35 U.S.C. 154(b) by 0 days.

(21) Appl. No.: 12/158,632

(22) PCT Filed: Dec. 18, 2006

(86) PCT No.: PCT/IB2006/003663

§ 371 (c)(1),
(2), (4) Date: Jun. 20, 2008

(87) PCT Pub. No.: WO2007/072161

PCT Pub. Date: Jun. 28, 2007

(65) Prior Publication Data

US 2008/0302152 A1   Dec. 11, 2008

(30) Foreign Application Priority Data

Dec. 21, 2005   (ZA) .............................. 2005/10380

(51) Int. Cl.
C05F 3/00 (2006.01)
C05F 3/02 (2006.01)
C05F 11/00 (2006.01)
C05F 11/02 (2006.01)

(52) U.S. Cl. .................................... 71/11; 71/21; 71/24

(58) Field of Classification Search ................ 71/11–26
See application file for complete search history.

(56) References Cited

U.S. PATENT DOCUMENTS

| | | | |
|---|---|---|---|
| 3,076,291 A * | 2/1963 | Gardner | 47/58.1 R |
| 3,655,395 A * | 4/1972 | Karnemaat | 426/531 |
| 3,939,280 A * | 2/1976 | Karnemaat | 426/2 |
| 4,084,938 A * | 4/1978 | Willard, Sr. | 424/125 |
| 5,021,077 A * | 6/1991 | Moore | 71/17 |
| 5,174,805 A | 12/1992 | Masuda | |
| 5,194,122 A * | 3/1993 | Bleeker | 203/34 |
| 5,630,861 A * | 5/1997 | Yaniv | 71/28 |
| 6,391,079 B1 * | 5/2002 | Takeda et al. | 71/27 |
| 6,434,884 B1 * | 8/2002 | Hartung | 47/58.1 R |
| 2004/0261481 A1 * | 12/2004 | Anaya-Olvera | 71/24 |

FOREIGN PATENT DOCUMENTS

GB   422 061 A   1/1935

OTHER PUBLICATIONS

Database WPI Week 198938, Derwent Publications Ltd., 1989-280270, XP-002439509, "Humic extract and humin produce from peat—by milling, acid and alkaline extraction, decanting and filtering", Mar. 1, 1989, Abstract.
Chemical Abstracts, XP 000663188 "Effect of humic substances from vine—canes mature compost on tomato seedling growth", Apr. 22, 1996, Abstract.
Derwent, XP-002235735, "Method for producing extracted liquor of seaweed for promoting growth of plant, obtained seaweed extracted liquor and compound fertilizer thereof", Oct. 11, 2000, Abstract.
International Search Report, PCT/IB2006/003663, Jul. 5, 2007.
International Preliminary Report on Patentability and Written Opinion of the International Searching Authority for PCT/IB2006/003663 Dated Jun. 24, 2008.

* cited by examiner

*Primary Examiner*—Wayne Langel
(74) *Attorney, Agent, or Firm*—Nixon Peabody LLP; Jeffrey L. Costellia

(57) ABSTRACT

This invention relates to a process for producing an organic fertilizer, and an organic fertilizer containing organic carbon carriers. According to an embodiment of the invention, the organic fertilizer is produced by mixing organic matter with water adding an organic acid or acids such as EDTA, amino acids, fuivic acid or propionic acid, preferably propionic acid (25%); or a base such as KOH or NaOH1 preferably KOH to the mixture; and decomposing organic matter with the acid/s or base in order to extract organic carbon solution having a carbon content of 10 to 20. The invention also relates to an organic fertilizer containing macro or micro nutrientfe and an organic carrier bound to or complexed with an organic carbon carrier.

11 Claims, No Drawings

FERTILIZER

BACKGROUND OF THE INVENTION

This Invention relates to fertilizer and a process of producing fertilizer.

SUMMARY OF THE INVENTION

According to a first aspect of the invention there is provided a process for producing an organic fertilizer, and an organic fertilizer containing organic carbon carriers.

An organic fertilizer is a fertilizer that is based on organic carbon extracted from peat, coal and or animal droppings or compost.

Organic carbon carriers are organic carbon that bind or complex with macro or micro nutrients.

A first aspect of the invention relates to a process of producing an organic fertilizer containing organic carbon carriers.

The organic fertilizer is produced by:
1) mixing organic matter with water adding an organic acid or acids such as EDTA, amino acids, fulvic acid or propionic acid, preferably propionic acid (25%); or a base such as KOH or NaOH, preferably KOH to the mixture; and
2) decomposing organic matter with the acid/s or base in order to extract organic carbon solution having a carbon content of 10 to 20%, preferably about 16%.

The organic matter may be peat, coal, or animal waste for example manure or guano with an organic acid, preferably peat or coal, most preferably peat.

Typically, 600-1300 liters of water is added per 100 kg of dry organic matter. "Dry organic matter" is organic matter with a moisture content of 15% or less, typically about 12%.

In the case of organic acid, from 5 to 25 liters of organic acid is added per 100 kg dry organic matter.

In the case of a base, from 6 to 14 kg base is added per 100 kg dry organic matter.

Preferably, a nutrient or nutrients such as a Potassium, Calcium, Magnesium or Ammonium salt, urea and/or micro nutrient/s is/are added to the liquid.

The Invention also relates to an organic fertilizer containing macro or micro nutrients and an organic carrier bound to or complexed with an organic carbon carrier.

The invention further relates to a liquid composition containing calcium, propionic acid and carbon carriers.

The liquid composition may be a calcium propionate organic fertilizer or a calcium propionate organic-based fertilizer.

A further aspect of the invention relates to a process for producing a dry organic fertilizer.

Dry organic matter such as peat (i.e. peat with a moisture content of about 12%) is mixed with an organic acid or acids such as EDTA, amino acids, fulvic acid or propionic acid, preferably propionic acid (25%), typically at an amount of between 5 and 25 liters per 100 kg organic matter; and water is then added until the moisture content of the peat reaches approximately 20%.

A dry nutrient, for example potassium sulphate or potassium chloride or a combination of the potassium salts may be added and the materials are then thoroughly mixed to form a mixture. Magnesium or calcium oxide may be added to the mixture, to absorb free moisture.

DETAILED DESCRIPTION

A first aspect of the invention relates to a process for producing a liquid organic fertilizer and to an organic liquid fertilizer containing organic carbon carriers.

The process is commenced by preparing an extract of organic carbon from natural organic material. The organic material used in the process is natural organic materials such as peat, coal or animal droppings such as sea bird guano, chicken, or kraal manure. The preference is to use peat or coal. A blend of peat and coal can also be used to increase the organic carbon content of the final organic carbon liquid.

±400 kg organic material is mixed with 2500-5000 liters of water in a container. Thereafter 25-50 kg KOH or preferably 20-100 liters organic acid such as EDTA or propionic acid, most preferably propionic acid (25%) is added and the mixture is stirred for 12 to 24 hours until the organic materials have decomposed until liquid carbon ex treated has a carbon content of 16% carbon (measured using a pH and an EC meter). The liquid is then left in order for the undissolved solids to settle at the bottom of the container. A supernatant liquid containing organic carbon is then pumped into a second container. The liquid will have a pH of from about 11 to 12 in the case of KOH and from about 3 to 4 in the case of organic acid.

This organic liquid fertilizer which contains organic carbon is now utilized to prepare organic carbon fertilizers containing plant nutrients:

1. Potassium Sulphate Organic Carbon Fertilizer

Potassium Sulphate is dissovled In the liquid organic carbon at a ratio of 30 grams per 100 ml of the organic liquid and agitating the liquid until the solids are completely dissolved, to provide an organic Potassium fertilizer containing 12.6% organic Potassium and 7.2% organic Sulphur. The pH of the solution is tested and organic acids preferably propionic acids, or EDTA, are added to the dissolved fertilizer to bring it to a pH of 6.6-7. Should the pH be below 6, KOH or Ammonium Nitrogen is added until the required pH had been reached.

2. Potassium Chloride Organic Carbon Fertilizer

Potassium Chloride is dissovled in the liquid organic carbon at a ratio of 30 grams per 100 ml of the organic liquid and agitating the liquid until the solids are completely dissolved, to provide an organic Potassium fertilizer containing 15% organic Potassium. The pH of the solution is tested and organic acids preferably propionic acids, or EDTA, are added to the dissolved fertilizer to bring it to a pH of 6.5-7. Should the pH be below 6, KOH or Ammonium Nitrogen is added until the required pH had been reached.

3. Potassium Nitrate Organic Carbon Fertilizer

Potassium Nitrate is dissovled in the liquid organic carbon at a ratio of 30 grams per 100 ml of the organic liquid and agitating the liquid until the solids are completely dissolved, to provide an organic Potassium fertilizer containing 12.4% organic Potassium and 3.9% Nitrogen. The pH of the solution is tested and organic acids preferably propionic acids, or EDTA, are added to the dissolved fertilizer to bring it to a pH of 6.5-7. Should the pH be below 6, KOH or Ammonium Nitrogen is added until the required pH had been reached.

4. Calcium Propionate Organic Carbon Fertilizer

Calcium Propionate is dissovled in the liquid organic carbon at a ratio of 40 grams per 100 ml of the organic liquid and agitating the liquid until the solids are completely dissolved, to provide an organic Calcium fertilizer containing 9.2% organic Calcium. The pH of the solution is tested and organic acids preferably propionic acids, or EDTA, are added to the dissolved fertilizer to bring it to a pH of 6.5-7. Should the pH be below 6, KOH or Ammonium Nitrogen is added until the required pH had been reached.

5. Calcium Nitrate Organic Carbon Fertilizer

Calcium Nitrate is dissovled in the liquid organic carbon at a ratio of 100 grams per 100 ml of the organic liquid and agitating the liquid until the solids are completely dissolved, to provide an organic Calcium fertilizer containing 10.5% organic Calcium and 6.5% organic Nitrogen. The pH of the solution is tested and organic acids preferably propionic acids, or EDTA, are added to the dissolved fertilizer to bring it to a pH of 6.5-7. Should the pH be below 6, KOH or Ammonium Nitrogen is added until the required pH had been reached.

6. Calcium Acetate Organic Carbon Fertilizer

Calcium Acetate is dissovled in the liquid organic carbon at a ratio of 50 grams per 100 ml of the organic liquid and agitating the liquid until the solids are completely dissolved, to provide an organic Calcium fertilizer containing 10.5% organic Calcium. The pH of the solution is tested and organic acids preferably propionic acids, or EDTA, are added to the dissolved fertilizer to bring it to a pH of 6.5-7. Should the pH be below 6, KOH or Ammonium Nitrogen is added until the required pH had been reached.

7. Magnesium Sulphate Organic Carbon Fertilizer

Magnesium Sulphate is dissovled in the liquid organic carbon at a ratio of 100 grams per 100 ml of the organic liquid and agitating the liquid until the solids are completely dissolved, to provide an organic Magnesium fertilizer containing 4.75% organic Magnesium and 6% organic Sulphur. The pH of the solution is tested and organic acids preferably propionic acids, or EDTA, are added to the dissolved fertilizer to bring it to a pH of 6.5-7. Should the pH be below 6, KOH or Ammonium Nitrogen is added until the required pH had been reached.

8. Magnesium Nitrate Organic Carbon Fertilizer

Magnesium Nitrate is dissovled in the liquid organic carbon at a ratio of 100 grams per 100 ml of the organic liquid and agitating the liquid until the solids are completely dissolved, to provide an organic Magnesiumfertilizer containing 4.75% organic Magnesium and 6.5% organic Nitrogen. The pH of the solution is tested and organic acids preferably propionic, acids, or EDTA, are added to the dissolved fertilizer to bring it to a pH of 6.5-7. Should the pH be below 6, KOH or Ammonium Nitrogen is added until the required pH had been reached.

9. Mono Potassium Phosphate Organic Carbon Fertilizer

Mono Potassium Phosphate is dissovled in the liquid organic carbon at a ratio of 30 grams per 100 ml, adding 6-10 ml of propionic acid or EDTA, and agitated until the solids are completely dissolved, to provide an organic Potassium fertilizer containing % organic Potassium Phosphate. The remaining solids are then left to settle down and the phosphate containing the liquid are then pumped out from the top. The liquid phosphates are then blended with organic carbon. The pH is then tested and should it be below 6, KOH or Ammonium Nitrogen is added until the required pH had been reached. Should it be above 7, either of the organic acids are then added until the required pH is reached.

10. Di Potassium Phosphate Organic Carbon Fertilizer

Di Potassium Phosphate is dissovled in the liquid organic carbon at a ratio of 30 grams per 100 ml of the organic liquid and agitating the liquid until the solids are completely dissolved, to provide an organic Potassium Fertilizer containing 12% organic Potassium and 12% organic Phosphate. The pH of the solution is tested and organic acids preferably propionic acids, or EDTA, are added to the dissolved fertilizer to bring it to a pH of 6.5-7. Should the pH be below 6, KOH or Ammonium Nitrogen is added until the required pH had been reached.

11. Mono Ammonium Phosphate Organic Carbon Fertilizer

Mono Ammonium Phosphate is dissovled in the liquid organic carbon at a ratio of 35 grams per 100 ml of the organic liquid and agitating the liquid until the solids are completely dissolved, to provide an organic Phosphate fertilizer containing 9.2% organic Phosphate and 4.3% organic Nitrogen. The pH of the solution is tested and organic acids preferably propionic acids, or EDTA, are added to the dissolved fertilizer to bring it to a pH of 6.5-7. Should the pH be below 6, KOH or Ammonium Nitrogen is added until the required pH had been reached.

12. Di Ammonium Phosphate Organic Carbon Fertilizer

Di Ammonium Phosphate is dissovled in the liquid organic carbon at a ratio of 40 grams per 100 ml of the organic liquid and agitating the liquid until the solids are completely dissolved, to provide an organic Phosphate fertilizer containing 20% organic Phosphate and 9.2% organic Nitrogen. The pH of the solution is tested and organic acids preferably propionic acids, or EDTA, are added to the dissolved fertilizer to bring it to a pH of 6.5-7. Should the pH be below 6, KOH or Ammonium Nitrogen is added until the required pH had been reached.

13. Ammonium Nitrate Organic Carbon Fertilizer

Ammonium Nitrate is dissovled in the liquid organic carbon at a ratio of 100 grams per 100 ml of the organic liquid and agitating the liquid until the solids are completely dissolved, to provide an organic Nitrogen fertilizer containing 16% organic Nitrogen. The pH of the solution is tested and organic acids preferably propionic acids, or EDTA, are added to the dissolved fertilizer to bring it to a pH of 6.5-7. Should the pH be below 6, KOH or Ammonium Nitrogen is added until the required pH had been reached.

14. Ammonium Sulphate Organic Carbon Fertilizer

Ammonium Sulphate is dissovled in the liquid organic carbon at a ratio of 80 grams per 100 ml of the organic liquid and agitating the liquid until the solids are completely dissolved, to provide an organic Nitrogen and organic Sulphur fertilizer containing 8.4% organic Nitrogen and 9.6% organic Sulphur. The pH of the solution is tested and organic acids preferably propionic acids, or EDTA, are added to the dissolved fertilizer to bring it to a pH of 6.5-7. Should the pH be below 6, KOH or Ammonium Nitrogen is added until the required pH had been reached.

15. Urea Organic Carbon Fertilizer

Urea is dissovled in the liquid organic carbon at a ratio of 100 grams per 100 ml of the organic liquid and agitating the liquid until the solids are completely dissolved, to provide an organic Nitrogen fertilizer containing 23% organic Nitrogen. The pH of the solution is tested and organic acids preferably propionic acids, or EDTA, are added to the dissolved fertilizer to bring it to a pH of 6.5-7, Should the pH be below 6, KOH or Ammonium Nitrogen is added until the required pH had been reached.

16. Micro Nutrients in Chelated Form Organic Carbon Fertilizer

Micro Nutrients in chelate form are dissovled in the liquid organic carbon at a ratio of 100 grams per 100 ml of the organic liquid and agitating the liquid until the solids are completely dissolved, to provide organic Micro nutrient complex fertilizer according to crop requirements. The pH of the solution is tested and organic acids preferably propionic acids, or EDTA, are added to the dissolved fertilizer to bring it to a pH of 6.5-7. Should the pH be below 6, KOH or Ammonium Nitrogen is added until the required pH had been reached.

The organic carbon liquid nutrients manufactured as single products as described above may be blended into different ratios, depending on the requirements of the crop (plants need different ratios depending on the stage of its growth).

Once the different nutrients are bound or blended into the organic carbon carrier it becomes a fully organic nutrient and can now be utilised for the production of organically grown fruit, vegetables and other edible plants, suitable for human or animal consumption.

The nutrients in the fertilizer that are now in an organic carbon carrier are far less subject to leaching into the soil solution and pollution of ground water be excess nutrients is greatly restricted. All the Macro and Micro nutrients in the organic carbon carrier are either chelated or clustered. In addition the cations are chelated and the anions are clustered.

The organic carbon nutrients can also be applied as foliar feeds to rectify nutrient deficiencies during the growth cycle of plant.

Another aspect of the invention relates to a liquid composition containing calcium and propionic acid, such as the Calcium Propionate Organic Carbon Fertilizer (4) described above. Apart from being a nutrient to improve the cell structure in plants, this product is a wide spectrum biocide and covers the following diseases:
1. Phytophtera SPP on the following crops:
   Citrus, avos, macadamias and all other tree crops susceptible to phytophtera as well as potatoes and tomatoes or late blight which is also a phytophtera species.
2. Dawny mildew on all susceptible plants
3. Powdery mildew on all susceptible plants
4. Fusarium SPP
5. Pithium
6. Dollar spot on golf courses
7. Brown spot on golf courses
8. Black spot on citrus
9. Anthracnosis on various crops
10. Bitterpit on apples
11. Internal rot on avos
12. Streptomysis scabbies (known as brown scab on potatoes)
13. Resectoniasolani on potatoes
14. Blossom end rot on watermelons, tomatoes, peppers and other cucurbits
16. Black stem on tobacco, cauliflower, broccoli, and all cabbage crops
17. Fuzy on apples and other pom fruits
18. Moulds and ropes on stored fruit and vegetables
19. Suppression of bacteria wits on various crops
20. Bacterial cancer
21. Bacterial spot on various crops
22. Suppression of nematodes and other parasitic microorganisms.

Another aspect of the invention is a process for manufacturing a dry organic fertilizer using peat as the organic carbon carrier.

Dry organic matter such as peat (i.e. peat with a moisture content of about 12%) is sifted through a 2 mm fine mesh to remove all the insoluble fibres. An organic acid, preferably propionic acid, is added in a ratio of between 500 ml and 1 liter to between 400 and 600 kg of sifted peat, dependant on the volume of the nutrient to be added to the sifted peat. Water is then added until the moisture content of the peat reaches approximately 20%. A dry nutrient, for example potassium sulphate or potassium chloride or a combination of the potassium salts are added to the peat until the total weight is 950 kg. The materials are then thoroughly mixed to form a mixture. The salts dissolve in the water and are bound to or complexed with organic carbon carriers in the mixture. As soon as the salts and the propionic acid are completely dissolved in the wet peat, 50 kg of either magnesium or calcium oxide is added to the mixture, to absorb all free moisture. These products absorb the free moisture and leave the organic potassium dry and ready to be bagged. All nutrients and micro nutrients follow the same process and are blended according to crop requirements.

The same processes are applicable to all nutrients blended into or onto the organic carrier in different concentrations depending on the solubility of each nutrient. The propionic acid assists in dissolving the nutrients that are usually insoluble, for instance calcium phosphates—mono calcium, di calcium and tri calcium phosphates.

Because the peat is high in organic carbon content, it increases the organic carbon content of the soil and serves as a nutrient source for micro organisms in the soil thus improving soil fertility.

Nutrients bound onto or into the organic carbon carrier, are control-released into the soil solution and thus not dependant on the cation exchange capacity of the soil, rendering the nutrients more readily available to the plant. Consequently, far less applied nutrients are necessary and therefore pollution of the soil and soil water is greatly diminished.

The invention claimed is:

1. A process for producing an organic fertilizer containing organic carbon carriers, the process comprising the following steps:
   1) mixing organic matter with water and adding a base to the mixture; and
   2) decomposing organic matter with the base in order to extract organic carbon solution having a carbon content of 10 to 20%; and
   3) adding propionic acid to the solution containing an extract of organic carbon, 2. The process as claimed in claim 1, wherein the carbon content of the solution is about 16%.

3. The process as claimed in claim 1, wherein the organic matter is peat, coal, or animal waste.

4. The process as claimed in claim 3, wherein the organic matter is peat.

5. The process as claimed in claim 1, wherein 600-1300 liters of water is added per 100 kg of dry organic matter.

6. The process as claimed in claim 5, wherein from 6 to 14 kg base is added per 100 kg dry organic matter.

7. The process as claimed in claim 1, wherein a nutrient or nutrients are added to the solution.

8. The process as claimed in claim 7, wherein the nutrients are a Potassium, Calcium, Magnesium or Ammonium salt, urea and/or micro nutrients.

9. The process as claimed in claim 1, wherein the propionic acid is added to bring the PH of the solution to 6.5-7.

10. The process as claimed in claim 1 or 9, wherein the base is KOH or NaOH.

11. The process as claimed in claim 10, wherein the base is KOH.

* * * * *